US008678966B2

(12) United States Patent
Kamamoto et al.

(10) Patent No.: US 8,678,966 B2
(45) Date of Patent: Mar. 25, 2014

(54) POWER TRANSMISSION CHAIN AND POWER TRANSMISSION APPARATUS INCLUDING SAME

(75) Inventors: Shigeo Kamamoto, Kashiwara (JP); Kozue Matsumoto, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 58 days.

(21) Appl. No.: 12/736,480

(22) PCT Filed: Apr. 16, 2009

(86) PCT No.: PCT/JP2009/057646
§ 371 (c)(1),
(2), (4) Date: Oct. 13, 2010

(87) PCT Pub. No.: WO2009/128497
PCT Pub. Date: Oct. 22, 2009

(65) Prior Publication Data
US 2011/0039643 A1    Feb. 17, 2011

(30) Foreign Application Priority Data

Apr. 16, 2008  (JP) .................................. 2008-107054

(51) Int. Cl.
*F16G 13/04*    (2006.01)
*F16G 13/02*    (2006.01)

(52) U.S. Cl.
USPC ........................... 474/215; 474/213; 474/229

(58) Field of Classification Search
USPC ............. 474/8, 201, 206, 210, 212–217, 229, 474/230, 234, 245, 167
See application file for complete search history.

(56) References Cited

U.S. PATENT DOCUMENTS

| 4,631,042 | A  | * | 12/1986 | Rattunde ........................... 474/8 |
| 7,892,127 | B2 | * | 2/2011  | Tada et al. ..................... 474/245 |
| 8,038,561 | B2 | * | 10/2011 | Yasuhara ....................... 474/245 |
| 8,057,342 | B2 | * | 11/2011 | Junig et al. .................... 474/215 |
| 2007/0042849 | A1 | * | 2/2007 | Tada et al. ..................... 474/206 |

(Continued)

FOREIGN PATENT DOCUMENTS

| DE | 102 35 342 A1 | 2/2004 |
| GB | 2 169 043 A   | 7/1986 |

(Continued)

OTHER PUBLICATIONS

European Search Report dated Nov. 10, 2011.

*Primary Examiner* — William E Dondero
*Assistant Examiner* — Minh Truong
(74) *Attorney, Agent, or Firm* — McGinn IP Law Group, PLLC

(57) ABSTRACT

A chain which is wound round on a pair of pulleys so as to extend therebetween includes a plurality of links and a plurality of connecting members. A first pin and a second pin of the connecting member are brought into rolling and sliding contact with each other at a contact portion which is displaced in association with a change in a flexing angle between the links. End faces of the first pin each have a projecting curved portion where a contact area is formed when the end faces are brought into contact with sheave surfaces of the pulleys. With respect to a vertical direction, a projecting center of the projecting curved portion is disposed between a position of a first contact portion when the chain bites into the drive pulley and a position of a second contact portion when the chain bites into the driven pulley.

11 Claims, 7 Drawing Sheets

(56) References Cited

U.S. PATENT DOCUMENTS

| | | | |
|---|---|---|---|
| 2007/0087883 A1* | 4/2007 | Tada et al. | 474/215 |
| 2008/0015070 A1* | 1/2008 | Miura | 474/155 |
| 2008/0051235 A1* | 2/2008 | Tada et al. | 474/8 |
| 2008/0070744 A1* | 3/2008 | Tada et al. | 476/40 |
| 2008/0287235 A1* | 11/2008 | Miura | 474/153 |

FOREIGN PATENT DOCUMENTS

| | | |
|---|---|---|
| JP | 2006-144855 A | 6/2006 |
| JP | 2006-226451 A | 8/2006 |
| JP | 2007-51712 A | 3/2007 |
| JP | 2007-271034 A | 10/2007 |

* cited by examiner

POWER TRANSMISSION CHAIN AND POWER TRANSMISSION APPARATUS INCLUDING SAME

TECHNICAL FIELD

The present invention relates to a power transmission chain and a power transmission apparatus including the same chain.

BACKGROUND ART

For example, endless power transmission chains which are used in automotive power transmission apparatuses such as a pulley-type continuously variable transmission (CVT) include an endless power transmission chain in which a plurality of link plates are connected together by pins and is wound on a pair of pulleys so as to extend therebetween for use.

Pairs of end faces of the pins having a projecting curved shape are brought into engagement with surfaces of sheaves of the pulleys whereby power is transmitted between the power transmission chain and the pulleys.

Related Art Document

Patent Document 1: JP-A-2006-226451

SUMMARY OF THE INVENTION

Problem that the Invention is to Solve

With respect to the power transmission chain described above, there are demands for an increase in rigidity in connection between the pins and the pulleys, a reduction in looseness of the pins when the pins bite into the pulleys, a reduction in driving noise and a further increase in practical durability.

An object of the invention is to solve these problems.

Means for Solving the Problem

With a view to attaining the object, according to an aspect of the invention, there is provide a power transmission chain (1) adapted to be wound on a first pulley (60) having a relatively small effective radius (D1) and a second pulley (70) having a relatively large effective radius (D2) so as to extend therebetween, the first pulley and the second pulley each having a pair of facing coned sheave surfaces (62a, 63a, 72a, 73a), the power transmission chain (1) characterized by comprising a plurality of links (2) which are aligned in a chain traveling direction (X) and a plurality of connecting members (50) which extend in a chain widthwise direction (W) which intersects the chain traveling direction at right angles for connecting together the plurality of links so as to flex relative to each other, and characterized in that the connecting member includes first and second power transmission members (3, 4), in that the first and second power transmission members have facing portions (12, 19) which face each other, in that the facing portions are brought into rolling and sliding contact with each other at a contact portion (T) which is displaced in association with a change in a flexing angle (θ) between the links, in that the first power transmission member includes end faces (17) each having a projecting curved portion (20) where a contact area (21) is formed when the first power transmission member is brought into contact with the sheave surfaces, and in that with respect to a vertical direction (V) which intersects both the chain traveling direction and the chain widthwise direction (W) at right angles, a projecting center (M) of the projecting curved portion is disposed in a first position (S1) which constitutes a position of the contact portion (T1) when the power transmission chain bites into the first pulley, a second position (S2) which constitutes a position of the contact portion (T2) when the power transmission chain bites into the second pulley or between the first position and the second position.

When the power transmission chain (the first power transmission member) bites into the pulley, the first power transmission member is squeezed under strong pressure by the pulley at the projecting centers thereof In addition, the first power transmission member receives a force from the second power transmission member by being brought into contact with the second power transmission member. As a result, a moment is produced in the first power transmission member about the projecting centers.

According to the aspect of the invention, the projecting center and the contact portion can be disposed close to each other with respect to a vertical direction when the first power transmission member bites into the first pulley, and the projecting center and the contact portion can be disposed close to each other with respect to the vertical direction when the first power transmission member bites into the second pulley. By doing so, the moment can be reduced which is produced about the projecting centers when the first power transmission member bites into the first pulley, and the moment can be reduced which is produced about the projecting centers when the first power transmission member bites into the second pulley. As a result, the projecting curved portions of the first power transmission member can be made difficult to slip on both the first and second pulleys. By suppressing the slippage of the first power transmission member on both the corresponding first and second pulleys, the rigidity in connection between the first power transmission member and the corresponding first and second pulleys can be increased. Further, a reduction in looseness produced between the first power transmission member and the corresponding pulleys and a reduction in engagement noise produced between the first power transmission member and the corresponding pulleys can be attained. Furthermore, the wear of the projecting curved portions of the first power transmission member can be suppressed, thereby making it possible to enhance the practical durability of the power transmission chain.

According to another aspect of the invention, there is provided a power transmission apparatus (100) comprising a first pulley having a relatively small effective radius, a second pulley having a relatively large effective radius, and the aforesaid power transmission chain which is wound on the first and second pulleys so as to extend therebetween.

In this case, the rigidity in connection between the power transmission chain and the corresponding pulleys can be enhanced. In addition, the looseness produced between the power transmission chain and the corresponding pulleys can be reduced. Further, the power transmission apparatus can be realized which has superior quietness and practical durability.

The first and second pulleys are variable radius pulleys which can vary their effective radii. With respect to the vertical direction which intersects both the chain traveling direction and the chain widthwise direction at right angles, irrespective of the effective radii, the projecting center of the projecting curved portion may be disposed at all times in a first position which constitutes a position of the contact portion when the power transmission chain bites into the first pulley, a second position which constitutes a position of the contact portion when the power transmission chain bites into the second pulley or between the first position and the second position.

In this case, irrespective of the effective radii, an increase in rigidity in connection and a reduction in looseness between the power transmission chain and the corresponding pulleys can be attained at all times. In addition, the quietness and practical durability can be maintained in an extremely superior state.

Note that in the above description, although the parenthesized numerals denote reference numerals of corresponding constituent elements in an embodiment which will be described later, there is no intention that claims of the invention are limited by the reference numerals.

BEST MODE FOR CARRYING OUT THE INVENTION

A preferred embodiment of the invention will be described by reference to the accompanying drawings.

Figure 1:
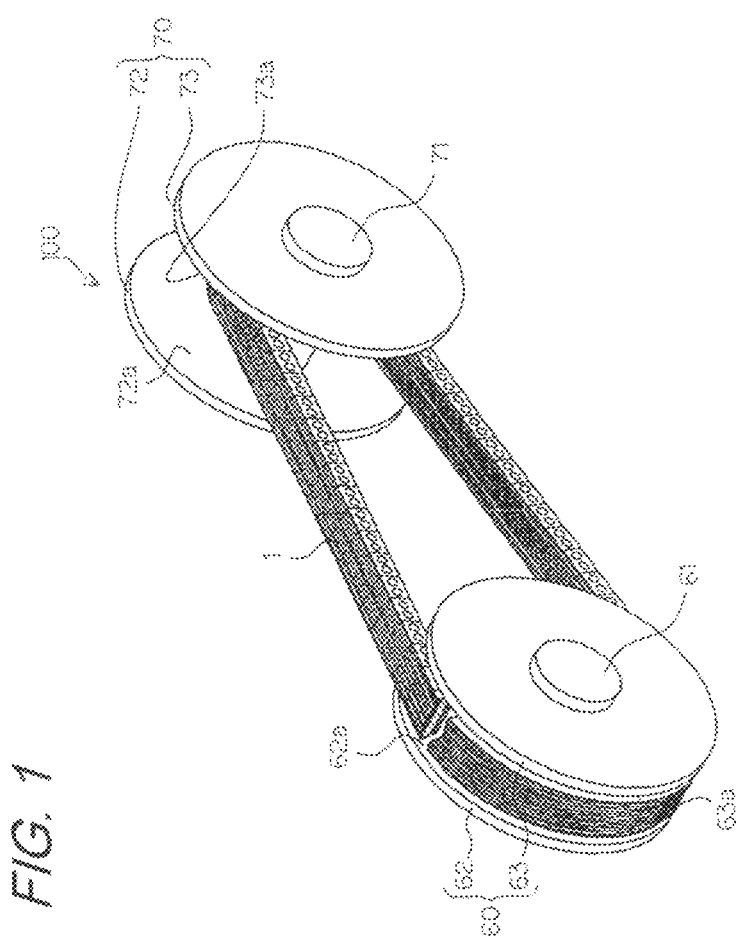
[FIG. 1] A perspective view showing exemplarily the configuration of a main part of a continuously variable transmission including a power transmission chain according to an embodiment of the invention.

FIG. 1 is a perspective view showing exemplarily the configuration of a main part of a chain type continuously variable transmission (hereinafter, also referred to simply as a continuously variable transmission) as a power transmission apparatus which includes a power transmission chain according to an embodiment of the invention. Referring to FIG. 1, a continuously variable transmission 100 is such as to be mounted on a vehicle such as a motor vehicle and includes a drive pulley 60 as a variable radius pulley which is made of a metal (a structural steel), a driven pulley 70 as a variable radius pulley which is made of a metal (a structural steel) and an endless power transmission chain 1 (hereinafter, also referred to simply as a chain) which is wound round these pulleys so as to extend therebetween. Note that the chain 1 shown in FIG. 1 is partially shown in section for the purpose of facilitation of understanding.

Figure 2:
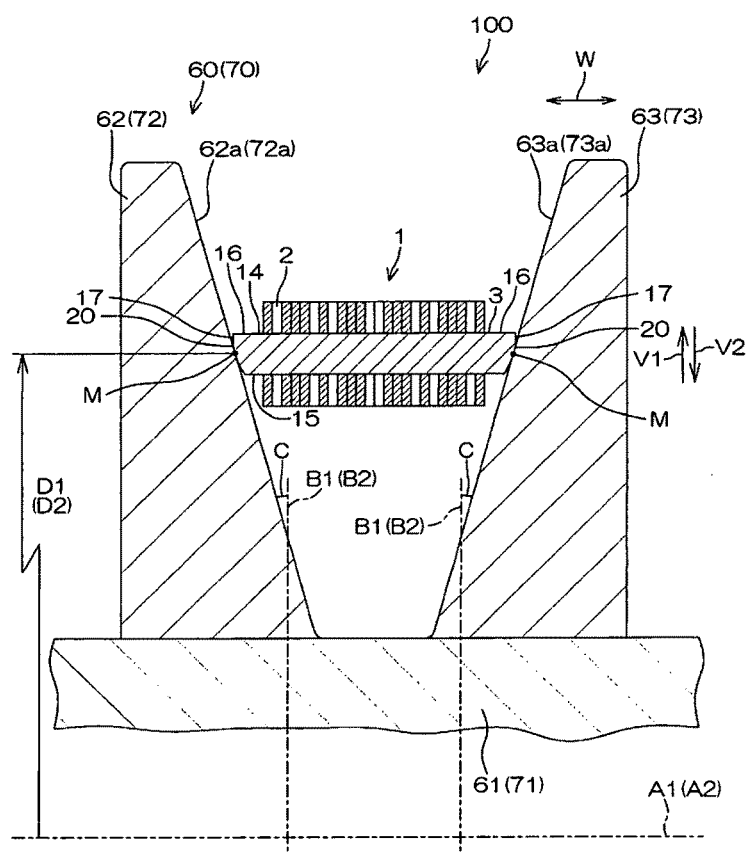
[FIG. 2] A partial enlarged sectional view of a drive pulley (a driven pulley) and a chain in FIG. 1.

FIG. 2 is a partially enlarged sectional view of the drive pulley 60 (the driven pulley 70) and the chain 1 shown in FIG. 1. Referring to FIGS. 1 and 2, the drive pulley 60 is attached to an input shaft 61 which connects to a power source of a vehicle so as to transmit power therefrom and can rotate together with the input shaft. The drive pulley 60 includes a fixed sheave 62 and a movable sheave 63. The fixed sheave 62 and the movable sheave 63 have their sheave surfaces 62a, 63a which face each other and make a pair. The respective sheave surfaces 62a, 63a include a cone-shaped inclined surface.

The sheave surfaces 62a, 63a are both inclined relative to first orthogonal planes B1 which intersect a center axis A1 of the drive pulley 60. A pulley half angle C which is an angle formed by a generator of each of the sheave surfaces 62a, 63a and its corresponding orthogonal plane B1 is set to 11°, for example. A groove is defined between the sheave surfaces 62a, 63a, and the chain 1 is held in the groove while being squeezed under a strong pressure.

A hydraulic actuator (not shown) is connected to the movable sheave 63 so as to alter a groove width. The groove width is designed to be altered by moving the movable sheave 63 in an axial direction (a left-right direction in FIG. 2) of the input shaft 61 when changing gear ratios. By doing so, the chain 1 is moved in a radial direction of the input shaft 61 (a vertical direction in FIG. 2) so as to alter an effective radius D1 of the pulley 60 with respect to the chain 1 (hereinafter, also referred to as an effective radius D1 of the pulley 60).

On the other hand, as is shown in FIGS. 1 and 2, the driven pulley 70 is attached to an output shaft 71 which connects to drive road wheels (not shown) so as to transmit power thereto and can rotate together with the output shaft. As with the drive pulley 60, the driven pulley 70 includes a fixed sheave 73 and a movable sheave 72 which have their sheave surfaces 72a, 73a which face each other and make a pair.

The sheave surfaces 72a, 73a are both inclined relative to second orthogonal planes B2 which intersect a center axis A2 of the driven pulley 70. A pulley half angle C which is an angle formed by a generator of each of the sheave surfaces 72a, 73a and its corresponding orthogonal plane B2 is set to 11°, for example. The pulley half angle C of the drive pulley 60 and the pulley half angle C of the driven pulley 70 are equal to each other.

As with the movable sheave 63 of the drive pulley 60, a hydraulic actuator (not shown) is connected to the movable sheave 72 so as to alter a groove width by moving the movable sheave 72 when changing gear ratios. By doing so, the chain 1 is moved so as to alter an effective radius D2 of the pulley 70 with respect to the chain 1 (hereinafter, also referred to as an effective radius D2 of the pulley 70).

Figure 3:
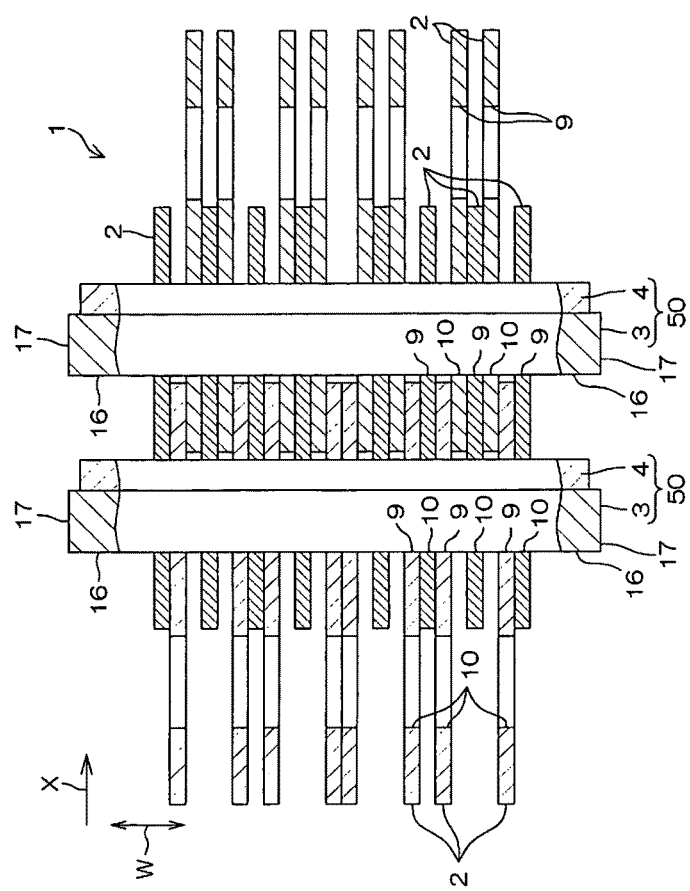
[FIG. 3] A horizontal sectional view of a main part of the chain 1.
Figure 4:
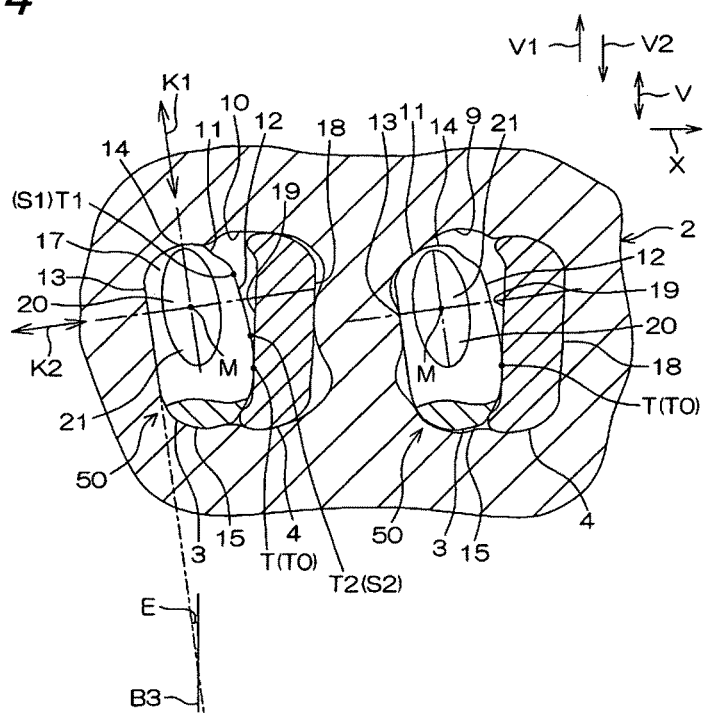
[FIG. 4] A vertical sectional view of a main part of a straight-line area of the chain 1.

FIG. 3 is a horizontal sectional view of a main part of the chain 1. FIG. 4 is a vertical sectional view of a main part of a chain straight-line area. Note that in the following description, when the description is made by reference to FIG. 4, the description is made based on a state resulting when the chain straight-line area is seen from a chain widthwise direction W.

Referring to FIGS. 3 and 4, the chain 1 includes a plurality of links 2 and a plurality of connecting members 50 which connect the links 2 to each other so that the links 22 flex relative to each other.

Hereinafter, a direction parallel to a direction in which the chain 1 travels is referred to as a chain traveling direction X, and in directions which intersect the chain traveling direction X, a direction which is parallel to a longitudinal direction of the connecting members 50 is referred to as a chain widthwise direction W, and a direction which intersects both the chain traveling direction X and the chain widthwise direction W at right angles is referred to as a vertical direction V.

One V1 of the vertical direction V is a direction which is oriented radially outwards of the chain 1 when the chain 1 flexes, and the other V2 of the vertical direction is a direction which is oriented radially inwards of the chain 1 when the chain 1 flexes.

Each link 2 is formed by pressing a flat steel plate by a die, and a front through hole 9 as a first through hole and a rear through hole 10 as a second through hole are formed in the link 2 at the front and rear thereof so as to be aligned in the chain traveling direction X. The links 2 are aligned both in the chain traveling direction X and the chain widthwise direction W.

In links 2 which are laid adjacent to each other in the chain traveling direction X, a front through hole 9 of a link 2 which is laid relatively upstream of the chain traveling direction X and a rear through hole 10 of a link 2 which is laid relatively downstream of the chain traveling direction X are aligned with each other in the chain widthwise direction W so as to face each other. The links 2 which are laid adjacent in the chain traveling direction X are connected together so as to flex relative to each other by the connecting members 50 which are inserted through the through holes 9, 10 which face each other. By doing so, the chain 1 having an endless shape as a whole is formed.

Each connecting member 50 includes a first pin 3 as a first power transmission member and a second pin 4 as a second power transmission member.

The first pin 3 is a long member which extends in the chain widthwise direction W. A circumferential surface 11 as a circumferential portion of the first pin 3 is formed into a smooth surface which extends in parallel with the chain widthwise direction W and has a front portion 12 acting as a facing portion which is oriented to the front in the chain traveling direction X, a rear portion 13 acting as a flat rear surface which is oriented opposite to the chain traveling direction X, and one end portion 14 and the other end portion 15 which act as a pair of end portions which face the vertical direction V.

The front portion 12 faces the second pin 4 and is brought into rolling and sliding contact with a rear flat portion 19 of the second pin 4, which will be described later, at a contact portion T (a contact point when seen from the chain widthwise direction W). The rear portion 13 has a predetermined angle of attack E relative to a tertiary orthogonal plane B3 which intersects the chain traveling direction X at right angles. The angle of attach E is set to on the order of 5 to 12°.

Referring to FIGS. 2 and 4, end faces 17 are provided at a pair of longitudinal end portions 16 of the first pin 3. Each end face 17 is curved to project outwards in the chain widthwise direction W and is oriented towards the other V2 side of the vertical direction V. The one end portion 14 of the circumferential surface 11 of the first pin 3 is formed wider in the chain widthwise direction than the other end portion 15.

A projecting curved portion 20 is formed on each end face 17. The projecting curved portion 20 is a portion where a contact area 21 is to be formed and is formed on at least part (the whole area, in this embodiment) of the corresponding end face 17.

When the first pins 3 bite into the corresponding pulleys 60, 70, the contact areas 21 on the end faces 17 are brought into contact with the corresponding pulleys 60, 70. Namely, these contact areas 21 are brought into friction contact (engagement) with the sheave surfaces 62a, 63a, 72a, 73a of the respective pulleys 60, 70 via a thin lubricant film.

The first pins 3 are squeezed between the corresponding sheave surfaces 62a, 63a, 72a, 73a, whereby power is transmitted between the respective pulleys 60, 70. Since the projecting curved portions 20 on the end faces 17 of the first pin 3 contribute directly to power transmission, the first pin 3 is formed of a material such as a bearing steel (SUJ2), for example, which has high strength and which is superior in wear resistance.

Referring to FIGS. 3 and 4, the second pin 4 (also referred to as a strip or an inter-piece) is a long member which is formed of a similar material to that of the first pin 3 and which extends in the chain widthwise direction W.

The second pin 4 is formed shorter than the first pin 3 so that a pair of end portions thereof are not brought into contact with the sheave surfaces of the respective pulleys. The second pin 4 is disposed further forwards in the chain traveling direction X than the first pin 3 with which it makes the pair.

A circumferential surface 18 of the second pin 4 is formed into a smooth surface which extends parallel to the chain widthwise direction W. This circumferential surface 18 has the rear flat portion 19 as a facing portion which is oriented opposite to the chain traveling direction X. The rear flat portion 19 constitutes a flat plane which is formed at an intermediate portion of the second pin 4 with respect to the vertical direction V and which intersects the chain traveling direction X at right angles and faces the front portion 12 of the first pin 3 with which the second pin 4 makes the pair.

The chain 1 is a so-called press-fit type chain. Specifically, in the front through hole 9 in each link 2, the corresponding first pin 3 is fitted loosely, and the corresponding second pin 4 is fixedly press fitted. In the rear through hole 10 of each link 2, the corresponding first pin 3 is fixedly press fitted and the corresponding second pin 4 is fitted loosely.

According to the configuration described above, the front portion 12 of the first pin 3 and the rear flat portion 19 of the second pin 4, which makes the pair with the first pin 3, make rolling and sliding contact with each other on a contact portion T which moves in association with a change in a flexing angle θ between the links 2 which are laid adjacent in the chain traveling direction X. The rolling and sliding contact means a contact which involves at least one of a rolling contact and a sliding contact. Note that the first and second pins 3, 4 may be loosely fitted in the corresponding front through hole 9 and rear through hole 10.

The front portion 12 projects in the chain traveling direction X. Specifically, a sectional shape of a portion of the front portion 12 which lies on the one V1 side of the vertical direction V with respect to a contact portion T0 in a straight-line area of the chain 1 is made into an involute curve. A sectional shape of a portion of the front portion 12 which lies on the other V2 side of the vertical portion V with respect to the contact portion T1 includes a smooth curve. By this configuration, a moving locus of the contact portion T in association with a flexure of the corresponding links 2 relative to each other includes an involute curve based on the first pin 3 as seen from the chain widthwise direction W. By this configuration, when the links 2 laid adjacent flex relative to each other, the corresponding first and second pins 3, 4 can make smooth rolling contact, whereby making it possible to attain a smooth flexure between the links 2. As a result, a string vibration motion of the chain 1 can be suppressed.

Figure 5:
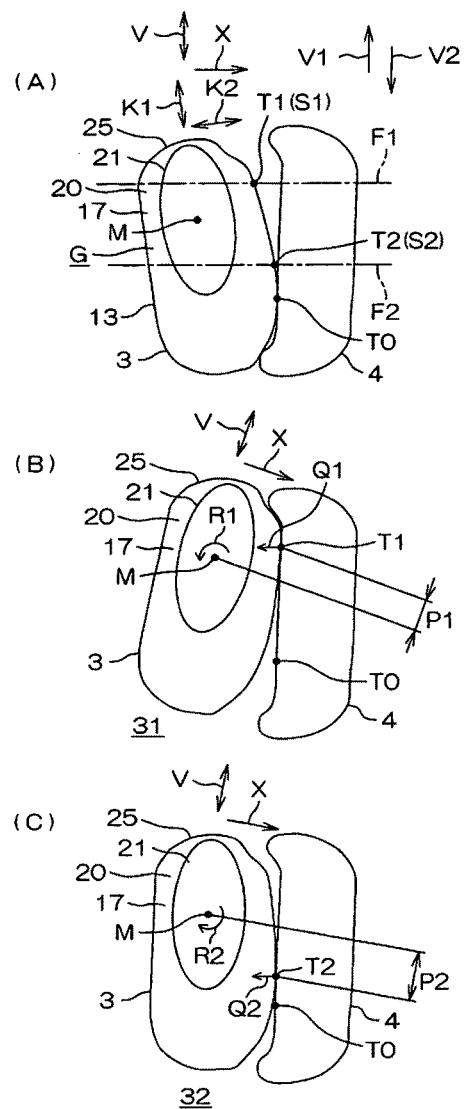
[FIG. 5] (A) is a side view of first and second pins as seen from a chain widthwise direction (W), (B) is a side view of the first and second pins in a first flexing area, and (C) is a side view of the first and second pins in a second flexing area.

FIG. 5(A) is a side view of the first and second pins 3, 4 as seen from the chain widthwise direction W. Referring to FIG. 5(A), in the first pin 3, a direction which extends along the rear portion 13 and intersects the chain widthwise direction W at right angles is referred to as a height direction K1. A length (height) of the first pin 3 with respect to the height direction K1 is on the order of 7 mm.

In the first pin 3, a direction which intersects the rear portion 13 at right angles is referred to as a thickness direction K2. A length (thickness) of the first pin 3 with respect to the thickness direction K2 is on the order of 3 mm, for example.

The projecting curved portion 20 is a surface which is formed by applying crowning to the end face 17 and which projects outwards in the chain widthwise direction W. The projecting curved portion 20 smoothly projects in a curved fashion as a whole.

When seen from the chain widthwise direction W, the projecting curved portion 20 of the first pin 3 is formed by applying crowning along the height direction K1 and applying crowning along the thickness direction K2.

Referring to FIGS. 2 and 5(A), the projecting curved portion 20 has a projecting center M as an apex portion. The contact areas 21, which are formed by the projecting curved portions 20 being brought into contact with the corresponding sheave surfaces 62a, 63a, 72a, 73a of the respective pulleys 60, 70, have a generally oval shape which is centered at the projecting center M. The contact area 21 of the first pin 3 is disposed so as to avoid a circumferential edge portion 25 of the first pin 3.

Referring to FIG. 2, the effective radii D1, D2 of the respective pulleys 60, 70 are defined as follows. Namely, the effective radius D1 of the drive pulley 60 is defined as a radial distance of the drive pulley 60 between the projecting center M of the projecting curved portion 20 of the first pin 3 which is squeezed by the drum pulley 60 and the center axis A1 of the drive pulley 60.

Similarly, the effective radius D2 of the driven pulley 70 is defined as a radial distance of the driven pulley 70 between the projecting center M of the projecting curved portion 20 of the first pin 3 which is squeezed by the driven pulley 70 and the center axis A2 of the driven pulley 70.

Figure 6:
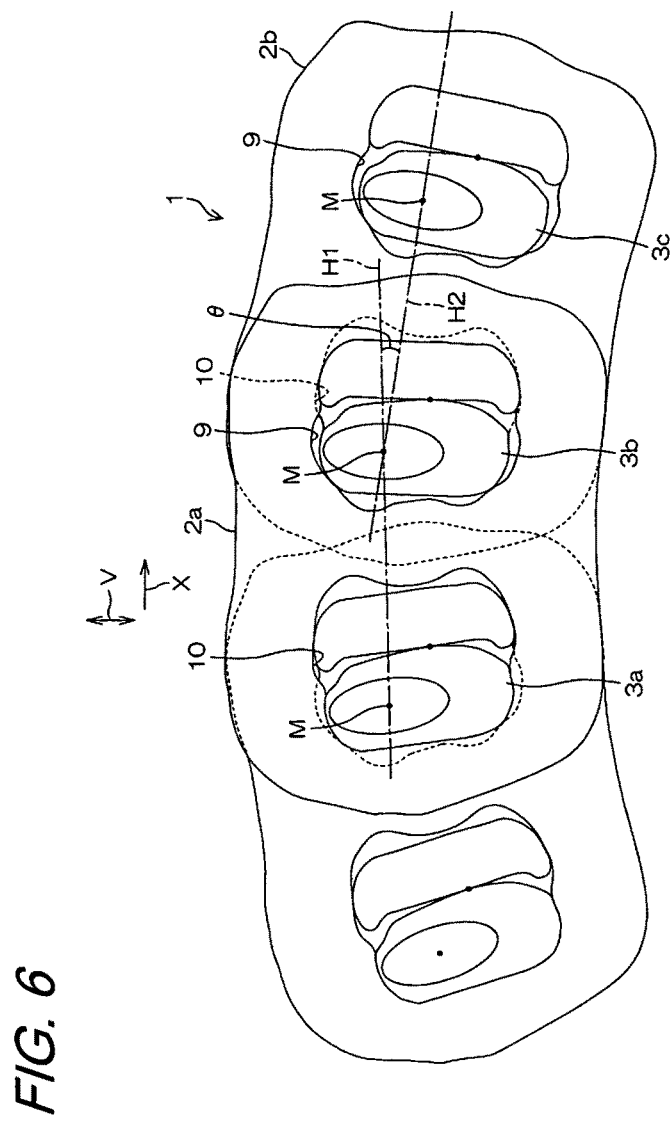
[FIG. 6] A side view of the chain in the flexing area.

The links 2 which are laid adjacent in the chain traveling direction X flex relative to each other to form a flexing angle θ in a flexing area of the chain 1 as is shown in FIG. 6. The flexing angle θ is defined as an angle which is formed by a first plane H1 and a second plane H2.

The first plane H1 is referred to as a plane which includes projecting centers M of first pins 3a, 3b which are inserted through individual through holes 10, 9, respectively, of one link 2a in the flexing area and which is parallel to the chain widthwise direction.

The second plane H2 is referred to as a plane which includes projecting centers M of first pins 3a, 3b which are inserted through individual through holes 10, 9, respectively, of another link 2b which is laid adjacent to the link 2a in the chain traveling direction X and which is parallel to the chain widthwise direction.

Figure 7:
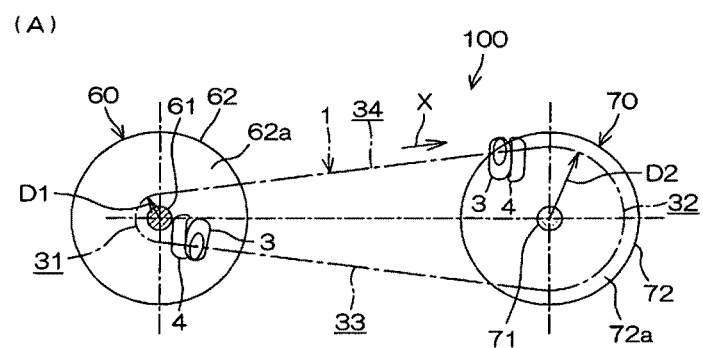
[FIG. 7] (A) is an exemplary drawing of the main part of the continuously variable transmission when it functions as a speed speed-reducing device, and (B) is an exemplary drawing of the main part of the continuously variable transmission when it functions as a speed-increasing device.
Figure 7:
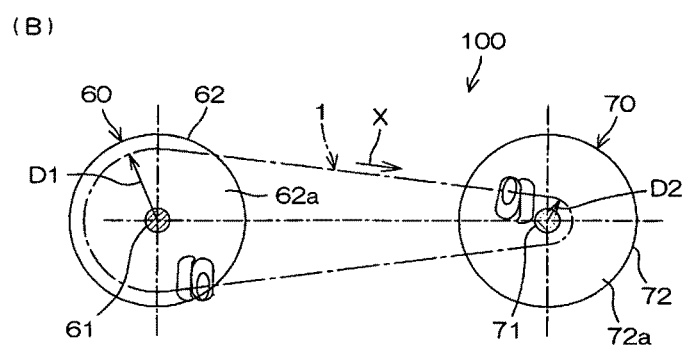

As is shown in FIG. 7(A), in the continuously variable transmission 100, a first flexing area 31 as a flexing area of the chain 1 which bites into the first pulley 60 and a second flexing area 32 as a flexing area of the chain 1 which bites into the second pulley 70 are formed.

In FIG. 7(A), the first and second pins 3, 4 are shown in an exaggeratedly enlarged fashion.

When the continuously variable transmission 10 functions as a speed-reducing device, the effective radius D1 of the first pulley 60 is relatively small, and the effective radius D2 of the driven pulley 70 is relatively large. Thus, the drive pulley 60 is referred to as a first pulley having a relative small effective radius, and the driven pulley 70 is referred to as a second pulley having a relatively large effective radius. As this occurs, the flexing angle θ of the first flexing area 31 is relatively large, and the flexing angle θ of the second flexing area 32 is relatively small.

FIG. 7(A) shows a state in which the reduction ratio of the continuously variable transmission 100 is the largest by the effective radius of the drive pulley 60 being a permissible least value and the effective radius of the driven pulley 70 being a permissible largest value.

When the first pins 3 of the chain 1 bite into the drive pulley 60, that is, when the chain 1 shifts from a straight-line area 33 to the first flexing area 31, the contact portion T of the first pin 3 is displaced from the contact portion T0 to the first contact portion T1 as is shown in FIG. 5(B).

Referring to FIG. 7(A), similarly, when the first pins 3 of the chain 1 bite into the driven pulley 70, that is, when the chain 1 shifts from a straight-line area 34 to the second flexing area 32, the contact portion T of the first pin 3 is displaced from the contact portion T0 to the second contact portion T2.

Referring to FIG. 5(A), the first contact portion T1 is disposed relatively on the one V1 side of the vertical direction V (radially outwards of the chain), and the second contact portion T2 is disposed on the other V2 side of the vertical direction V (radially inwards of the chain).

The embodiment is characterized in that the projecting center M of the projecting curved portion 20 is disposed in a first position S1 which constitutes the position of the first contact portion T1, a second position S2 which constitutes the position of the second contact portion T2 or between the first position S1 and the second position S2 with respect to the vertical direction V.

More specifically, as seen from the chain widthwise direction W, the projecting center M is disposed within an area G which is defined by a first straight line F1 which extends along the chain traveling direction X and passes through the first contact portion T1, a second straight line F2 which extends along the chain traveling direction X and passes through the second contact portion T2 and an outer circumferential edge portion 25 of the end face 17.

The projecting center M is disposed generally at a central portion between the first and second straight lines F1, F2 with respect to the vertical direction V. The projecting center may be disposed close to the second straight line F2 of the first and second straight lines F1, F2 with respect to the vertical direction V.

The projecting center M is disposed generally at a central portion of the first pin 3 with respect to the chain traveling direction V. The position of the projecting center M is set so that the contact area 21 does not reach the outer circumferential edge portion 25 of the end face 17, that is, so that an edge contact does not occur in which the outer circumferential edge portion 25 of the end face 17 contacts the pulley.

Thus, as is shown in FIG. 5(B), the projecting center M of the first pin 3 and the first contact portion T1 in the first flexing area 31 are disposed so close that they are spaced by a predetermined first distance P1 apart from each other with respect to the vertical direction V. As this occurs, as seen from the chain widthwise direction W, the first pin 3 in the first flexing area 31 receives a first pressure Q1 as a resisting force from the second pin 4 at the first contact portion T1, and the projecting curved portion 20 is in contact with the drive pulley 60 under a strong pressure to thereby be fixed thereto (refer to FIGS. 2 and 5(B)). As a result, as seen from the chain widthwise direction W, a moment R1 is produced on the first pin 3 in the first flexing area 31 about the projecting center M by the first pressure Q1. However, since the first distance P1 as an arm length of the moment R1 is shorter than the length of the first pin 3 in the vertical direction V, the moment R1 is also small.

As is shown in FIG. 5(C), the projecting center M of the second pin 4 and the second contact portion T2 in the second flexing area 32 are disposed so close that they are spaced by a predetermined second distance P2 apart from each other with respect to the vertical direction V. As this occurs, as seen from the chain widthwise direction W, the second pin 4 in the second flexing area 32 receives a second pressure Q2 as a resisting force from the second pin 4 at the second contact portion T2, and the projecting curved portion 20 is in contact with the driven pulley 70 under a strong pressure to thereby be fixed thereto (refer to FIGS. 2 and 5(C)). As a result, as seen from the chain widthwise direction W, a moment R2 is produced on the second pin 4 in the second flexing area 32 about the projecting center M by the second pressure Q2. However, since the second distance P2 as an arm length of the moment R2 is shorter than the height of the first pin 3 in the vertical direction V, the moment R2 is also small.

Thus, according to the embodiment, the projecting center M and the first contact portion T1 when the first pin 3 bites into the drive pulley 60 can be disposed close to each other with respect to the vertical direction V, and the projecting center M and the second contact portion T2 when the first pin 3 bites into the driven pulley 70 can be disposed close to each other with respect to the vertical direction V.

By this configuration, the moment R1 produced about the projecting center M when the first pin 3 bites into the drive pulley 60 can be made small. In addition, the moment R2 produced about the projecting center M when the first pin 3 bites into the driven pulley 70 can be made small.

As a result, the projecting curved portion 20 of the first pin 3 can be made difficult to slip on both the pulleys 60, 70. By suppressing the slippage of the first pin 3 on both the corresponding pulleys 60, 70, the rigidity in connection between the first pin 3 and the corresponding pulleys 60, 70 can be enhanced.

Further, a reduction in looseness produced between the first pin 3 and the corresponding pulleys 60, 70 and a reduction in engagement noise produced between the first pin 3 and the corresponding pulleys 60, 70 can be attained. Furthermore, the wear of the projecting curved portions 20 of the first pin 3 can be suppressed, thereby making it possible to enhance the practical durability of the chain 1.

Thus, the rigidity in connection between the chain 1 and the corresponding pulleys 60, 70 can be enhanced. In addition, the looseness produced between the chain 1 and the corresponding pulleys 60, 70 can be reduced. Further, the continuously variable transmission 100 can be realized which has superior quietness and practical durability.

With respect to the vertical direction V, irrespective of the effective radii D1, D2, the projecting center M can be disposed at all times in the first position S1, the second position S2 or between the first position S1 and the second position S2. By this configuration, irrespective of the effective radii D1, D2, an increase in rigidity in connection and a reduction in looseness between the chain 1 and the corresponding pulleys 60, 70 can be attained at all times. In addition, the quietness and practical durability can be maintained in an extremely superior state.

While the continuously variable transmission 100 has been described as functioning as the speed-reducing device, as is shown in FIG. 7(A), the similar configuration works even in the event that the continuously variable transmission functions as a speed-increasing device, as is shown in FIG. 7(B). Namely, in the event of the continuously variable transmission 100 function as a speed-increasing device, the effective radius D1 of the drive pulley 60 is relatively large, while the effective radius D2 of the driven pulley 70 is relatively small. Consequently, the drive pulley 60 constitutes the second pulley having the relatively large effective radius, while the driven pulley 70 constitutes the first pulley having the relatively small effective radius.

In general, the vehicle continuously variable transmission 100 is designed so that the maximum value of the reduction ratio is relatively large, while the maximum value of the speed-increasing ratio is relatively small. Thus, the disposition of the projecting center M may be determined in consideration of the event of the continuously variable transmission 100 functioning as the speed-reducing device.

The invention is not limited to the contents of the embodiment that has been described heretofore and hence can be modified variously without departing from what is described in claims of the invention. For example, while in the embodiment, the disposition of the projecting center M has been described which is based on the first and second contact portions T1, T2 when the reduction ratio is the largest value in design, the invention is not limited thereto. For example, a configuration may be adopted in which the disposition of the projecting center M is set based on the positions S1, S2 of the first and second contact portions T1, T2 when the reduction ratio is an arbitrary predetermined gear ratio.

The invention is not limited to the mode in which the groove widths of both the drive pulley 60 and the driven pulley 70 are variable and hence may be applied to a mode in which the groove width of only one of the pulleys 60, 70 is variable, while the groove width of the other pulley is not variable and is fixed to a predetermined groove width. While in the embodiment, the groove widths have been described as varying continuously (in a stepless fashion), the invention may be applied to other power transmission apparatuses in which the groove widths vary step by step or in which the groove widths are fixed (no speed change).

The invention claimed is:

1. A power transmission chain adapted to be wound on a first pulley having a relatively small effective radius and a second pulley having a relatively large effective radius so as to extend therebetween, the first pulley and the second pulley each having a pair of facing coned sheave surfaces, the power transmission chain comprising:
   a plurality of links which are aligned in a chain traveling direction; and
   a plurality of connecting members which extend in a chain widthwise direction which intersects the chain traveling direction at right angles for connecting together the plurality of links so as to flex relative to each other,
   wherein the connecting members include first power transmission members and second power transmission members,
   wherein the first and second power transmission members have facing portions which face each other,
   wherein the facing portions are brought into rolling and sliding contact with each other at a contact portion which is displaced in association with a change in a flexing angle between the links,
   wherein a first power transmission member of the first power transmission members includes end faces each having a projecting curved portion where a contact area is formed when the first power transmission member is brought into contact with the sheave surfaces, and
   wherein, in a direction which intersects both the chain traveling direction and the chain widthwise direction at right angles, a projecting center of the projecting curved portion is only disposed in a first position which aligns with a position of the contact portion when the first power transmission member bites into the first pulley so that the power transmission chain shifts from a straight-line area to a first flexing area in which the power transmission chain bites into the first pulley, a second position which aligns with a position of the contact portion when the first power transmission member bites into the second pulley so that the power transmission chain shifts from a straight-line area to a second flexing area in which the power transmission chain bites into the second pulley, or between the first position and the second position.

2. A power transmission apparatus comprising:
a first pulley having a relatively small effective radius;
a second pulley having a relatively large effective radius; and
the power transmission chain set forth in claim 1 which is wound on the first and second pulleys so as to extend therebetween.

3. A. power transmission apparatus as set forth in claim 2, wherein the first and second pulleys comprise variable radius pulleys having variable effective radii, and
wherein in the direction which intersects both the chain traveling direction and the chain widthwise direction at right angles, irrespective of the effective radii, the projecting center of the projecting curved portion is disposed at all times in the first position which overlaps the position of the contact portion when the first power transmission member bites into the first pulley, the second position which overlaps the position of the contact portion when the first power transmission member bites into the second pulley or between the first position and the second position.

4. A power transmission apparatus according to claim 2, wherein a flexing angle between the links at the position of the contact portion when the power transmission member bites into the first pulley is greater than a flexing angle between the links at the position of the contact portion when the first power transmission member bites into the second pulley.

5. A power transmission chain according to claim 1, wherein the contact area is disposed so as to avoid a circumferential edge portion of the first power transmission member.

6. A power transmission chain according to claim 1, wherein a flexing angle between the links at the position of the contact portion when the first power transmission member bites into the first pulley is greater than a flexing angle between the links at the position of the contact portion when the first power transmission member bites into the second pulley.

7. A power transmission apparatus according to claim 1, wherein, with respect to the direction which intersects both the chain traveling direction and the chain widthwise direction at right angles, the projecting center of the projecting curved portion is disposed so as to always overlap the position of the contact portion when the first power transmission member bites into the first pulley, the position of the contact portion when the first power transmission member bites into the second pulley, or an area therebetween.

8. A power transmission apparatus according to claim 1, wherein, with respect to the direction which intersects both the chain traveling direction and the chain widthwise direction at right angles, the position of the contact portion when the first power transmission member bites into the first pulley and the position of the contact portion when the first power transmission member bites into the second pulley are located on opposite sides of the projecting center of the projecting curved portion.

9. A power transmission chain according to claim 1, wherein the projecting center is disposed off center with respect to a height direction of the first power transmission member.

10. A power transmission chain adapted to be wound on a first pulley having a relatively small effective radius and a second pulley having a relatively large effective radius so as to extend therebetween, the first pulley and the second pulley each having a pair of facing coned sheave surfaces, the power transmission chain comprising:
a plurality of links which are aligned in a chain traveling direction; and
a plurality of connecting members which extend in a chain widthwise direction which intersects the chain traveling direction at right angles for connecting together the plurality of links so as to flex relative to each other,
wherein the connecting members include first power transmission members and second power transmission members,
wherein the first and second power transmission members have facing portions which face each other,
wherein the facing portions are brought into rolling and sliding contact with each other at a contact portion which is displaced in association with a change in a flexing angle between the links,
wherein a first power transmission member of the first power transmission members includes end faces each having a projecting curved portion where a contact area is formed when the first power transmission member is brought into contact with the sheave surfaces, and
wherein, in a direction which intersects both the chain traveling direction and the chain widthwise direction at right angles, a projecting center of the projecting curved portion is only disposed within an area vertically defined by a position of the contact portion when the first power transmission member bites into the first pulley so that the power transmission chain shifts from a straight-line area to a first flexing area in which the power transmission chain bites into the first pulley and a position of the contact portion when the first power transmission member bites into the second pulley so that the power transmission chain shifts from a straight-line area to a second flexing area in which the power transmission chain bites into the second pulley.

11. A power transmission chain according to claim 10, wherein the projecting center is disposed off center with respect to a height direction of the first power transmission member.

* * * * *